US011697917B2

United States Patent
Myers et al.

(10) Patent No.: US 11,697,917 B2
(45) Date of Patent: Jul. 11, 2023

(54) ANTICIPATORY MODIFICATION OF MACHINE SETTINGS BASED ON PREDICTED OPERATIONAL STATE TRANSITION

(71) Applicant: Deere & Company, Moline, IL (US)

(72) Inventors: David J. Myers, Dubuque, IA (US); Doug M. Lehmann, Centralia, IA (US); Robert A. Hamilton, Raymond, IA (US); Kevin W. Campbell, Dubuque, IA (US); Joseph R. Keene, Asbury, IA (US)

(73) Assignee: Deere & Company, Moline, IL (US)

( * ) Notice: Subject to any disclaimer, the term of this patent is extended or adjusted under 35 U.S.C. 154(b) by 1019 days.

(21) Appl. No.: 16/523,550

(22) Filed: Jul. 26, 2019

(65) Prior Publication Data
US 2021/0025133 A1   Jan. 28, 2021

(51) Int. Cl.
*E02F 9/20* (2006.01)
*G06N 20/00* (2019.01)
*E02F 3/43* (2006.01)

(52) U.S. Cl.
CPC .............. *E02F 9/2025* (2013.01); *E02F 3/43* (2013.01); *G06N 20/00* (2019.01)

(58) Field of Classification Search
USPC .......................................................... 701/50
See application file for complete search history.

(56) References Cited

U.S. PATENT DOCUMENTS

| 5,435,131 | A | 7/1995 | Hausman et al. |
| 8,010,260 | B2 | 8/2011 | Toda |
| 8,065,060 | B2 * | 11/2011 | Danko .................. G05B 13/021 701/50 |
| 8,452,454 | B2 * | 5/2013 | Puura ...................... B66C 13/20 701/50 |

(Continued)

FOREIGN PATENT DOCUMENTS

| EP | 1630636 B1 | 4/2013 |
| EP | 3162965 A1 | 5/2017 |

OTHER PUBLICATIONS

German Search Report issued in application No. DE102020208048.8 dated Aug. 25, 2022 (04 pages).

*Primary Examiner* — Jonathan M Dager
(74) *Attorney, Agent, or Firm* — Michael Best & Friedrich LLP (57) ABSTRACT

Methods and systems for adjusting operating parameters of a machine in anticipation of a transition from a current operational state to a predicted subsequent operational state. An electronic controller receives a data stream indicative of actuator settings, sensor outputs, and/or operator control settings and applies a pattern detection AI that is configured to determine a current operational state of the machine based on patterns detected in the data stream. The controller then applies a reinforcement learning AI that is configured to produce as an output one or more target operating parameters based at least in part on a predicted subsequent operational state of the machine. The one or more target operating parameters are applied to the machine and at least one performance metric of the machine is monitored. The reinforcement learning Ai is retrained based at least in part on the monitored performance metric(s).

15 Claims, 6 Drawing Sheets

(56) References Cited

U.S. PATENT DOCUMENTS

| | | | |
|---|---|---|---|
| 8,527,158 B2* | 9/2013 | Faivre | E02F 9/265 701/50 |
| 8,838,324 B2* | 9/2014 | Suzuki | E02F 9/267 714/39 |
| 9,139,981 B2 | 9/2015 | Mitchell et al. | |
| 9,304,501 B2* | 4/2016 | Danko | B25J 9/1628 |
| 9,464,410 B2* | 10/2016 | Johnson | E02F 3/434 |
| 9,598,845 B2* | 3/2017 | Baba | E02F 9/2033 |
| 9,644,346 B2* | 5/2017 | Seki | E02F 3/435 |
| 9,739,038 B2* | 8/2017 | Baba | E02F 9/262 |
| 9,982,414 B2 | 5/2018 | Jang | |
| 10,120,369 B2* | 11/2018 | Taylor | E02F 9/2037 |
| 11,204,254 B2* | 12/2021 | Gonzalez | E02F 9/20 |
| 11,222,202 B2* | 1/2022 | Kean | G06F 18/217 |
| 11,306,460 B2* | 4/2022 | Nakamura | E02F 3/32 |
| 11,340,079 B1* | 5/2022 | Ebrahimi Afrouzi | G06V 20/56 |
| 2004/0267404 A1* | 12/2004 | Danko | E02F 3/438 700/245 |
| 2006/0243180 A1* | 11/2006 | Sundermeyer | G06F 11/2263 714/E11.158 |
| 2007/0168100 A1* | 7/2007 | Danko | B25J 9/1628 701/50 |
| 2009/0204259 A1* | 8/2009 | Danko | G05B 13/024 700/250 |
| 2009/0228177 A1* | 9/2009 | Mintah | E02F 9/26 701/50 |
| 2010/0154400 A1* | 6/2010 | Krajnik | F15B 11/165 60/459 |
| 2012/0317444 A1* | 12/2012 | Suzuki | G06Q 10/06 714/39 |
| 2013/0158679 A1* | 6/2013 | Oh | G05B 11/01 700/11 |
| 2014/0067092 A1* | 3/2014 | Cesur | G05B 15/02 700/83 |
| 2014/0107897 A1* | 4/2014 | Zhu | E02F 9/264 701/50 |
| 2017/0328031 A1* | 11/2017 | Jang | E02F 9/265 |
| 2018/0174377 A1* | 6/2018 | Collins | E02F 9/261 |
| 2020/0005185 A1* | 1/2020 | Kim | G06N 20/00 |
| 2020/0007064 A1* | 1/2020 | Wang | B60L 3/12 |
| 2020/0032483 A1* | 1/2020 | Ready-Campbell | E02F 9/2045 |
| 2020/0157775 A1* | 5/2020 | Sawodny | E02F 9/2029 |
| 2020/0347580 A1* | 11/2020 | Raszga | G06N 3/08 |

* cited by examiner

ANTICIPATORY MODIFICATION OF MACHINE SETTINGS BASED ON PREDICTED OPERATIONAL STATE TRANSITION

BACKGROUND

The present invention relates to systems and methods for adjusting the machine settings and actuators during the operation of a machine. More specifically, the present invention relates to adjusting machine settings and actuators during operation of machinery such as, for example, construction machinery (e.g., excavators, loaders, and/or crawlers) that may be operated for multiple different tasks.

SUMMARY

Construction machinery—including, for example, an excavator, loader, and/or crawler—may be operated to perform many different operations or tasks during the course of a day. Each of these operations can be further broken down into smaller and smaller individual tasks or states that transition from one to the next (sometimes quickly and frequently). Each individual operational state may require an adjustment of certain actuators and/or machine settings. If transitions between operational states can be identified and predicted, operation of the machine can potentially be improved by adjusting one or more machine setting or actuator in advance of a transition from one operational state to another.

In some implementations, machine learning mechanisms are used to enable the identification of the current operation and/or operational state of the machine. As more data is collected and analyzed, the machine is better able to identify the current operation and/or operational state of the machine. Once trained, the machine-learning model is deployed to a vehicle controller unit (VCU) or other dedicated controller operating on the machine. This deployed logic is able to make real-time classification of the machine operational state. Furthermore, in some implementations, a second machine learning model is trained and implemented to determine appropriate adjustments to machine settings and/or actuators of the machine for a predicted transition from the current operational state to another operational state in advance of the transition to improve the speed of the transition and/or the operation of the machine in the next operational state after the transition.

With a connected machine, data collection may be continuous. In some implementations, data is collected using a telematics or "Internet-of-Things" (IoT) solution. As additional data is collected and added, the models continue to be updated and redeployed.

In one embodiment, the invention provides a method for adjusting operating parameters of a machine in anticipation of a transition from a current operational state to a subsequent operational state. An electronic controller receives a data stream indicative of actuator settings, sensor outputs, and/or operator control settings. The controller applies a pattern detection AI that is configured to receive the data stream as an input and to determine a current operational state of the machine based on patterns detected in the data stream. The controller then applies a reinforcement learning AI that is configured to produce as an output one or more target operating parameters based at least in part on a predicted subsequent operational state of the machine. The one or more target operating parameters are applied to the machine and at least one performance metric of the machine is monitored. The reinforcement learning AI is retrained based at least in part on the monitored performance metric(s).

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1A:
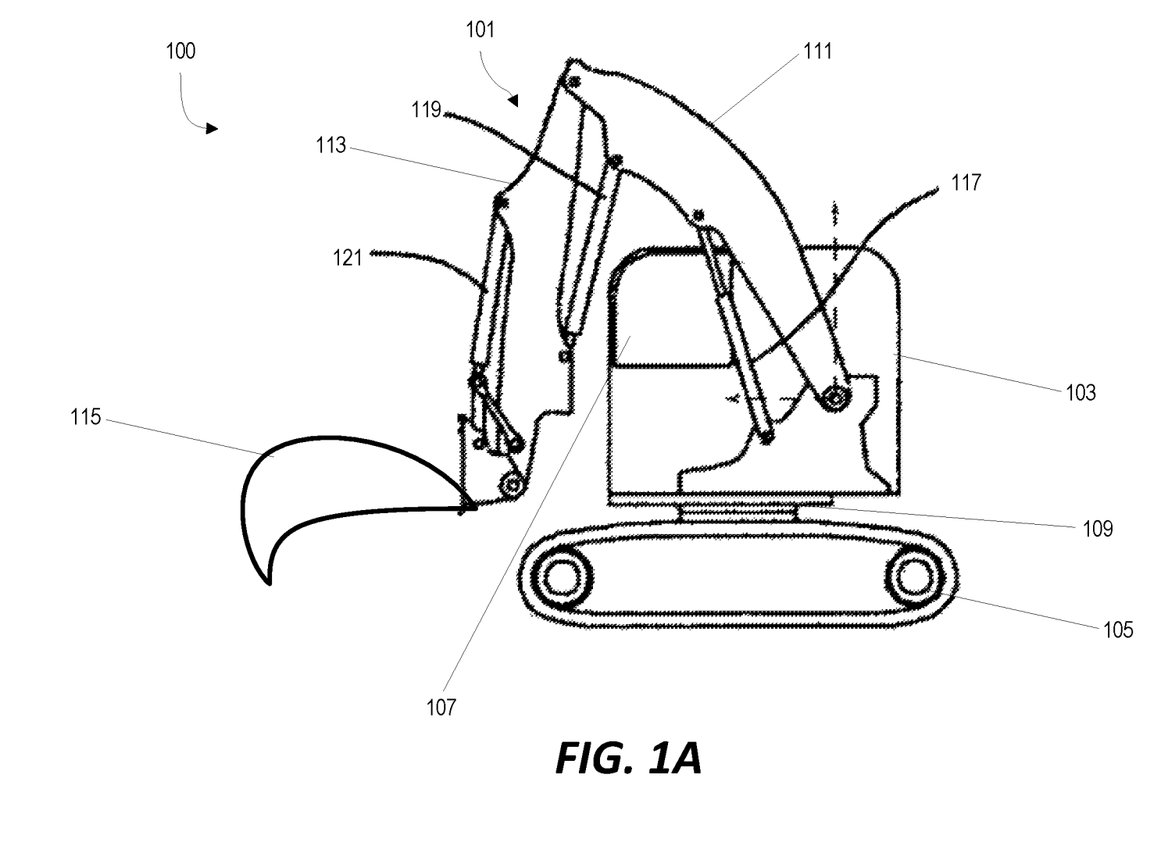
FIG. 1A is an elevation view of an excavator according to one embodiment.

FIG. 1A illustrates an example of an excavator 100. The excavator 100 includes a boom arm 101, a main vehicle body 103, and a pair of tracks 105. The tracks 105 are operable to control the movement of the excavator 100 on a surface. The main vehicle body 103 includes an operator cab 107 in which user controls are operated to control the movement and operation of the excavator 100. The main vehicle body 103 is rotatably coupled to the tracks 105 to controllably turn the main vehicle body 103 relative to the tracks 105. The boom arm 101 is coupled to the main vehicle body 103 such that rotation of the main vehicle body 103 relative to the tracks 105 also alters the angle of the boom arm 101 relative to the tracks 105.

The boom arm 101 includes a hoist boom 111, a stick boom 113, and an end effector 115 (e.g., a bucket). The hoist boom 111 is tiltably coupled to the main vehicle body 103 at its proximal end and is tiltably coupled to the stick boom 113 at its distal end. The stick boom 113 is coupled to the hoist boom 111 at its proximal end and is tiltably coupled to the end effector 115 at its distal end. The boom arm 101 also includes at least one hoist cylinder 117—a hydraulic cylinder coupled to the hoist boom 111 and the main vehicle body 103 and configured to controllably adjust an angle of the hoist boom 111 relative to the main vehicle body 103. For example, as the hoist cylinder 117 extends, the angle of the hoist boom 111 increases away from a horizontal position towards a vertical position. Conversely, as the hoist cylinder 117 retracts, the angle of the hoist boom 111 decreases towards horizontal. Similarly, a stick cylinder 119 is coupled between the stick boom 113 and the hoist boom 111 to controllably adjust an angle of the stick boom 113 relative to the hoist boom 111 and a tilt cylinder 121 is coupled between the end effector 115 and the stick boom 113 to controllably adjust an angle of the end effector 115 relative to the stick boom 113.

Figure 1B:
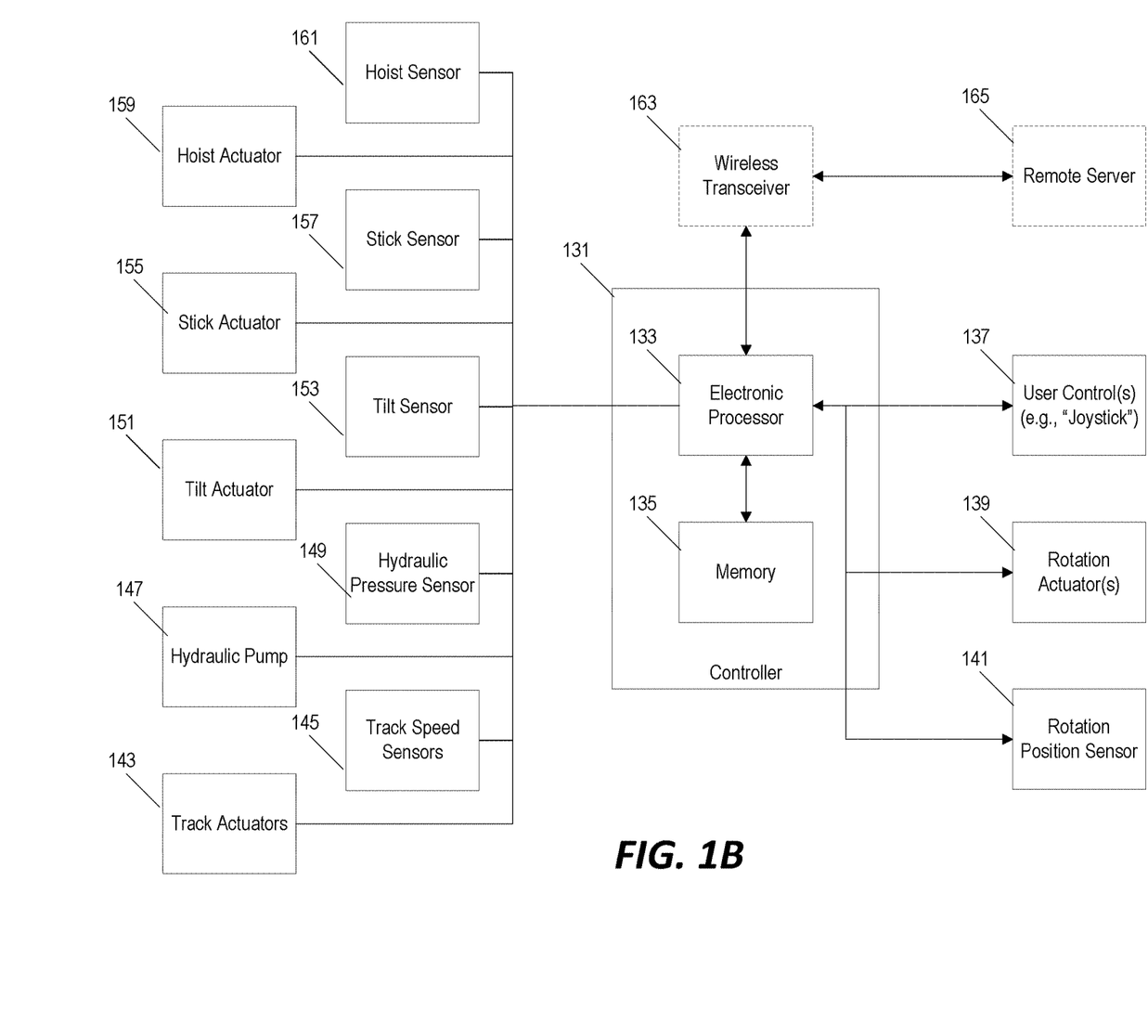
FIG. 1B is a block diagram of the control system for the excavator of FIG. 1A.

FIG. 1B illustrates simplified example of a control system for controlling the operation of the excavator 100 of FIG. 1A. A controller 131 (e.g., a vehicle control unit (VCU)) includes an electronic processor 133 and a non-transitory computer-readable memory 135. The memory 135 stores data and instructions that are executed by the processor 133 to provide the functionality of the excavator including, for example, the functionality described herein. The controller 131 is communicatively coupled to one or more user controls 137 including, for example, a joystick positioned in the operator cab 107 of the excavator 100. An operator of the excavator 100 adjusts the user controls 137 to control the operation of the excavator 100 and signals from the user controls 137 are transmitted to the controller 131. The controller 131 then operates the various actuators of the excavator 100 based on the signals received from the user controls 137.

The controller 131 is also communicatively coupled to multiple different sensors and actuators. For example, as illustrated in FIG. 1B, the controller 131 is communicatively coupled to one or more rotation actuators 139 that are configured to controllably adjust the rotational position of the main vehicle body 103 relative to the tracks 105. The controller 131 is also communicative coupled to a rotation position sensor 141 (e.g., a Hall Effect sensor) configured to provide a signal to the controller 131 indicative of a rotational position of the main vehicle body 103 relative to the tracks 105. The controller 131 is also communicative coupled to one or more track actuators 143 that controllably cause movement of the excavator tracks 105 to cause the excavator 100 to move along a surface and one or more track speed sensors 145 configured to provide an output to the controller 131 indicative of a vehicle speed of the excavator 100.

The system also includes several sensors and actuators associated with the boom arm 101 that are communicatively coupled to the controller 131. For example, one or more hydraulic pumps provide are coupled to the hoist cylinder 117, the stick cylinder 119, and the tilt cylinder 121 to provide the hydraulic pressure necessary to extend or retract these hydraulic cylinders. In some implementations, the hydraulic pump system is also used to control rotational movement of the main vehicle body 103 relative to the tracks 105 and/or to provide movement of the tracks 105 for motive power of the excavator 100. One or more hydraulic pressure sensors 149 are configured to sense the current hydraulic pressure(s) of the hydraulic system, which can be used by the controller 131 as feedback for control of the hydraulic system (including the hydraulic pump 147). The system also includes a tilt actuator 151, a stick actuator 155, and a hoist actuator 159, which, in some implementations, include a hydraulic fill valve and/or a hydraulic release valve. The hydraulic fill valve is operated to controllably increase the pressure in the cylinder by allowing pressurized hydraulic fluid (e.g., from the hydraulic pump) to enter the cylinder. The hydraulic release valve is operated to controllably decrease the pressure in the cylinder by releasing hydraulic fluid from the cylinder into a reserve tank. The system also includes a tilt sensor 153, a stick sensor 157, and a hoist sensor 159 which, in some implementations, are configured to output a signal indicative of a displacement of the respective cylinder (e.g., how far the cylinder is extended or retracted). In this example, the tilt actuator 151, the stick actuator 155, and the hoist actuator 159 are all communicative coupled to the controller 131 and are operated by control signals received from the controller 131. Similarly, in the example of FIG. 1B, the tilt sensor 153, the stick sensor 157, and the hoist sensor 161 are all communicative coupled to the controller 131 and are configured to provide signals indicative of the displacement of the respective cylinders to the controller 131, which in turn controls the boom arm actuators 151, 155, 159 based at least in part on the signals from the boom arm displacement sensors 153, 157, 161. However, other configurations are possible. For example, a system may be configured to include a "boom arm" control system that is communicatively coupled to the VCU, that provides a signal to the VCU indicative of the pose of the boom arm, and that receives a signal from the VCU indicative of a target pose or a change in pose.

Finally, in some implementations, the system also includes a wireless transceiver 163 that is communicatively coupled to the controller 131. In some such implementations, the controller 131 is configured to use the wireless transceiver 163 to communicate with a remote server computer 165. For example, as discussed in further detail below, the controller 131 may be configured to use the wireless transceiver 163 to send sensor/actuator data to the remote server 165 and/or to receive updated machine settings from the remote server (including, for example, updates to one or more machine-learning/artificial intelligence models).

Figure 2:
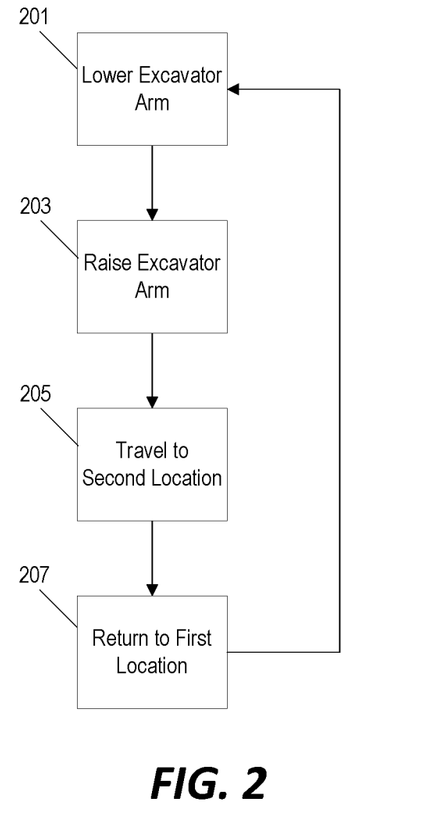
FIG. 2 is a flowchart of an example of a "load and carry" operation performed using the excavator of FIG. 1A.

As discussed above, the excavator 100 of FIGS. 1A and 1B can be operated to perform several different operations. Each of these operations can be further broken down into smaller individual operational states or tasks. For example, FIG. 2 illustrates a series of smaller operational states of the excavator 100 while performing a lift-and-carry operation. The excavator 100 lowers the boom arm 101 (step 201) to fill the bucket with material (e.g., dirt) at a first location. The excavator 100 then raises the boom arm 101 to lift the material (step 203) and operates the tracks 105 to travel to a second location (step 205). The material is released at the second location and the excavator 100 operates the tracks 105 to return to the first location (step 207) where it repeats the process. While performing the "lift-and-carry" operation of FIG. 2, the excavator 100 may lower and raise the boom arm 101 several times. However, there is a delay in the frequency of those repeated lower-and-raise cycles as the excavator 100 travels to and from the second location where the material is released.

Figure 3:
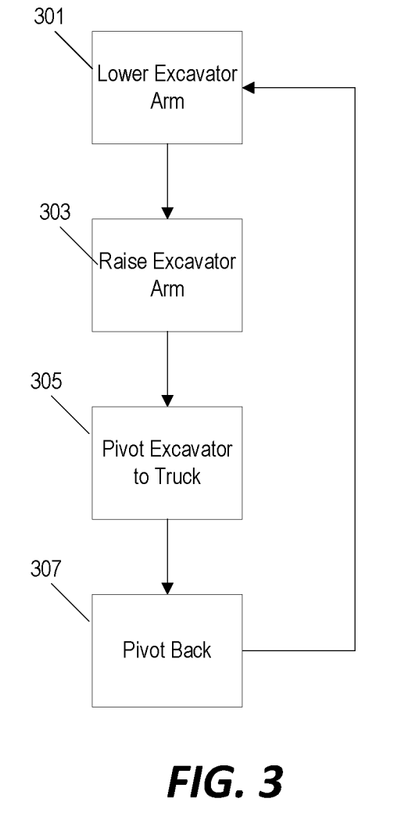
FIG. 3 is a flowchart of an example of a "truck loading" operation performed using the excavator of FIG. 1A.

FIG. 3 illustrates an example of some of the smaller operational states of the excavator 100 while performing a "truck loading" operation. Again, the excavator 100 lowers the boom arm 101 (step 301) to fill the bucket with material (e.g., dirt) and then raises the boom arm 101 to lift the material (step 303). However, instead of travelling to a different location while carrying the materials, the excavator operates the rotation actuators 139 to pivot the boom arm 101 relative to the tracks 105 until the end effector is positioned over a truck (step 305). The excavator 100 then operates the end effector to release the material into the truck and pivots back to its original position (e.g., above a dirt pile or a digging site) (step 307). The excavator then repeats the process.

Like the "load-and-carry" example of FIG. 2, the excavator 100 may lower and raise the boom arm 101 several times while performing the "truck loading" operation of FIG. 3. However, because the excavator 100 does not need to travel from one location to another, the time delay between those repeated lower-and-raise cycles is less than the delay between cycles in the "lift-and-carry" operation of FIG. 2. Accordingly, the frequency of the repeated "lower-and-raise" cycles is greater in the "truck loading" operation of FIG. 3 than in the "lift-and-carry" operation of FIG. 2.

Figure 4:
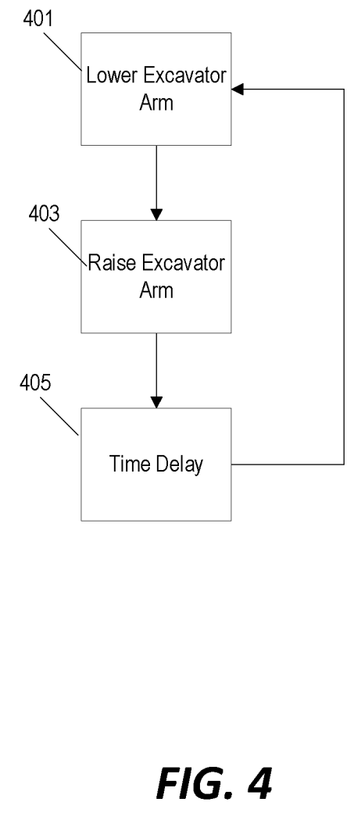
FIG. 4 is a flowchart of a simplified characterization of performing the operations of FIG. 2 and FIG. 3 based on operational states of the boom/arm of the excavator of FIG. 1A.

Both the "lift-and-carry" operation of FIG. 2 and the "truck loading" operation of FIG. 3 can be characterized by the specific sequence of "operational states" performed, by the frequency of repeated operational states, and/or by the relative duration of time spent in each operational states. For example, FIG. 4 illustrates a simplified characterization of both the "lift-and-carry" operation of FIG. 2 and the "truck loading" operation of FIG. 2. As shown in FIG. 3, both operations include lower the boom arm 101 to fill the bucket with material (step 401) followed by a raising of the boom arm 101 (step 403). Both operations also exhibit a time delay (step 405) between the raising of the boom arm (i.e., the lifting of the material) and the next instance of the lowering of the boom arm (i.e., the beginning of the next iteration at step 401). However, these two operations can be differentiated, for example, based on the magnitude of the time delay (step 405). For example, as discussed above, the "lift-and-carry" operation will exhibit a longer time delay between cycles (and, therefore, a lower frequency) than the "truck loading" operation because of the need for the excavator to travel to and from the second location before repeating the cycle.

Different individual operational states of the excavator 100 often require different actuator settings. The performance of the excavator 100 may be improved if the excavator 100 has knowledge of the current operational state of the excavator 100 by adjusting various actuator and machine settings based on the determined current operational state. Furthermore, if the excavator 100 were able to determine in advance the next operational state, the controller 131 could be configured to alter various actuator and machine settings in anticipation of the next operational state. Performance and efficiency of the excavator 100 might also be further improved if the excavator 100 were able to anticipate when the transition to the next operational state would occur.

Figure 5:
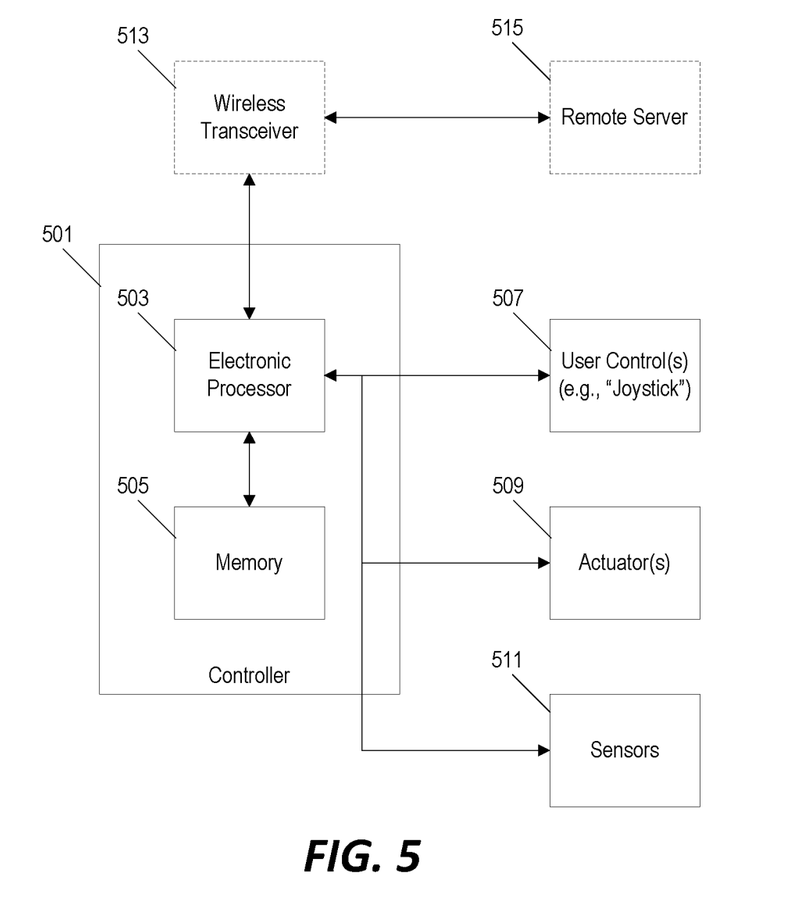
FIG. 5 is a block-diagram of a vehicle controller unit (VCU) according to one embodiment.

Although the examples above focus on an excavator 100, other types of machinery (including, for example, crawlers and loaders) could similarly benefit from systems and methods for determining a current operational state of the machine, predicting a next operational state that the machine will transition into, and, in some cases, predicting when the transition to the next operational state will occur. FIG. 5 illustrates an example of a machine configured to predict a next operational state and to adjust one or more machine or actuator settings in anticipation of a transition into the predicted next operational state. Like the example of FIG. 1B, the system of FIG. 5 includes a controller 501 (e.g., a VCU) with an electronic processor 503 and a non-transitory computer-readable memory 505. The memory 505 stores data and instructions that are executed by the electronic processor 503 to provide the functionality of the controller 501 (including, for example, the functionality described herein). The control 501 is communicatively coupled to one or more user controls 507, one or more machine actuators 509, and one or more machine sensors 511. The machine sensors 511 are configured to output a signal to the controller 501 indicative of a current operational characteristic of the machine including, for example, a hydraulic pressure, a displacement of a hydraulic cylinder, a rotational position, or a vehicle/track speed. In some implementations, the controller 501 may also be communicative coupled to a wireless transceiver and configured to use the wireless transceiver 513 to communicate with a remote server computer 515. The control system of FIG. 1B and discussed above is a more specific example of the control system illustrated in FIG. 5.

Figure 6:
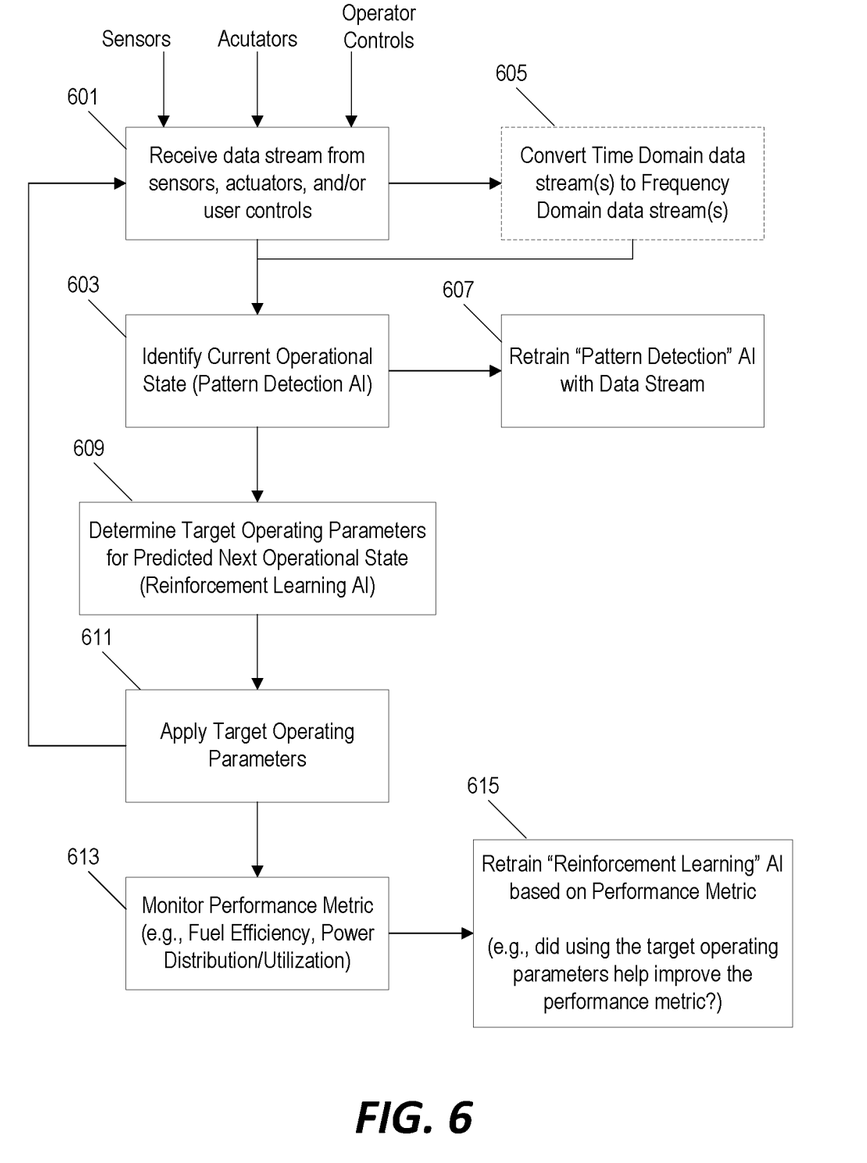
FIG. 6 is a flowchart of a method for applying adjustments to machine settings and/or actuators in anticipation of a transition to a predicted next operational state using a pattern detection AI and a reinforcement learning AI in the system of FIG. 5.

FIG. 6 illustrates a method that applies two "artificial intelligence" modules in order to determine and apply adjustments to machine actuators and/or machine settings in anticipation of a transition from one operational state to another. A "Pattern Detection AI" is configured to determine a current operational state of the machine and a "Reinforcement Learning AI" is configured to determine target operating parameters for a predicted subsequent operational state of the machine (including, for example, adjustments to actuator settings and/or machine settings). In some implementations, one or both of these modules are provided as a "neural network" configured to receive one or more inputs and to produce one or more outputs. In some implementations, the method of FIG. 6 is executed by a local controller of the machine (e.g., controller 501 of FIG. 5); in other implementations, the method of FIG. 6 is executed by the remote server computer 515 after receiving data from the machine; and, in still other implementations, the method of FIG. 6 is executed by both the local controller 501 and the remote server computer 515 working in coordination with each other.

In the example of FIG. 6, the system (e.g., controller 501 and/or the remote server computer 515) receives a data stream from the sensors, actuators, and/or user controls indicative of sensed operating conditions, current actuator settings, and user inputs, respectively (step 601). Data from this stream is provided as an input to the "pattern detection AI" (step 603). In some implementations, the data stream is provided as an input to the pattern detection AI as a Time Domain data stream. In other implementations, the system may be configured to convert the time domain data stream to a frequency domain data stream (step 605) which is then provided as an input to the pattern detection AI in addition to or instead of the time domain data stream. The pattern detection AI is configured to provide as an output an identification of the current operational state of the machine and/or a predicted subsequent operational state of the machine. In some implementations, some or all of the data stream and/or the output(s) of the pattern detection AI are transmitted to the remote server computer 515 and used to retrain/update the pattern detection AI (step 607).

The reinforcement learning AI uses the output of the pattern detection AI to determine target operating parameters for the predicted next operational state (step 609). These operational parameters may include, for example, target actuator settings, adjustments to actuator settings, updated machine settings, etc. These target operating parameters are then applied (step 611) and the system monitors performance of the machine before, during, and/or after the transition to the next operational state (step 613) to determine whether improved performance was attained by applying the target operating parameters as determined by the Reinforcement Learning AI. The Reinforcement Learning AI is then retrained based on the monitored performance metrics (step 615).

In some implementations, the current operational state of the machine is determined by the pattern detection AI based on patterns detected in the data stream from one or more sensor, actuator, and/or user control input. Accordingly, the pattern detection AI may be configured to detect a particular pattern in the data stream and to identify an operational state that corresponds to the detected pattern.

Furthermore, the system may be configured to identify a predicted next operational state of the machine based, at least in part, on a sequence and timing of previous transitions between operational states (for example, based on the frequency between the lower-and-raise cycles of the excavator boom arm discussed above in reference to FIGS. 2 through 4). However, in various different implementations, the prediction of the next operational state may be performed, for example, by the Pattern Detection AI, the Reinforcement Learning AI, or by a third AI module.

For example, in some implementations, the system is configured to store information regarding an ongoing sequence of operational states identified by the pattern detection AI. In some implementations, the ongoing sequence information is provided as another input to the Pattern Detection AI, which is then configured to provide a predicted next operational state as another output of the Pattern Detection AI. In other implementations, the ongoing sequence information is provided as an input to the Reinforcement Learning AI. In some such implementations, the Reinforcement Learning AI is configured to output both an identification of the predicted next operational state as well as the target operating parameters. However, in other implementations, the Pattern Detection AI is configured instead to output only the target operational parameter that are to be implemented by the controller without providing an explicitly indication of the predicted next operational state. Accordingly, the target operating parameters account for a predicted operational state transition regardless of whether the identity of the predicted next state is ever provided as an output to the controller.

Furthermore, in some implementations, the AI module that is configured to provide as an output an identification of the predicted next operational state may also be configured to output a predicted timing of the transition to the predicted next operational state. Accordingly, the system may be configured to determine appropriate actuator/setting adjustments based on the indicated timing. However, in other implementations, the method of FIG. 6 is performed iteratively or continuously such that the Reinforcement Learning AI is configured to continuously or periodically provide updated target operating parameters. In this way, target operating parameters that are designed in anticipation of a predicted transition to a next operational state are provided in the same output stream from the Reinforcement Learning AI as target operating parameters that are designed to optimize performance of the machine in a current ongoing operational state. Accordingly, the system is able to use the two separate AI modules to adjust actuator and/or machine settings in anticipation of a predicted transition from one operational state to another whether or not the predicted next operational state is explicitly identified to the controller.

If the Pattern Detection AI is configured to provide as an output the predicted next operational state of the machine, then the Pattern Detection AI will be retrained, in part, based on a determination of whether the prediction was correct. Conversely, if the Reinforcement Learning AI is configured to (explicitly or implicitly) provide the prediction of the next operational state transition, then the Reinforcement Learning AI will be retrained based on (i) whether the output target operating parameters actually improved machine performance and (ii) whether the prediction of the next operational state was accurate. In some implementations, the Reinforcement Learning AI is retrained based on the monitored performance metrics and not a separate determination of whether the prediction of the next operational state was accurate (because the accuracy of the prediction of the next operational state will affect whether the applied operational parameters improve the performance of the machine).

Figure 7:
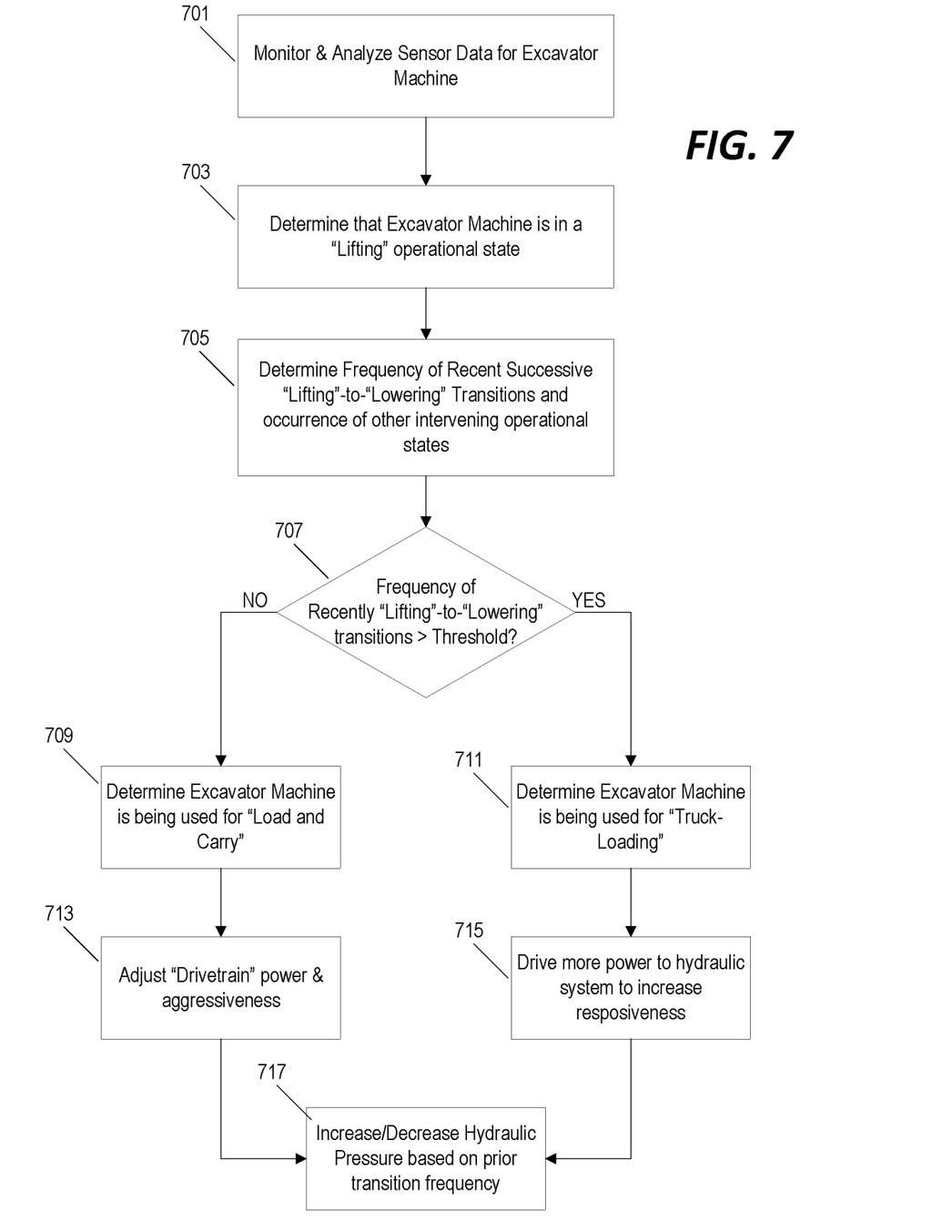
FIG. 7 is flowchart of an example using the method of FIG. 6 for adjusting machine settings and actuators in the excavator of FIG. 1A in anticipation of a predicted transition from a "lifting" operation of the excavator boom to a "lowering" operation of the excavator boom.

The two-stage AI mechanism illustrated din FIG. 6 may be applied to various different machines including, for example, the excavator of FIGS. 1A and 1B. FIG. 7 illustrates an example of using the method of FIG. 6 to adjust the operating parameters of the excavator of FIGS. 1A and 1B. First, the system monitors & analyzes sensor data for the excavator machine (i.e., the data stream) (step 701). Based on the data stream, the system determines that the excavator is in a "lifting" operational state (i.e., the boom arm is being operated to lift material in the bucket) (step 703). The system then analyzes the ongoing sequence of determined operational states in order to determine the frequency of recent successive transitions between the "lifting" operational state and a "lowering" operational state (step 705). If the frequency is not greater than a threshold (step 707), then the system determines that the excavator machine is being used for a "Load-and-Carry" operation (i.e., the operation of FIG. 2) (step 709). Conversely, if the frequency is greater than the threshold, then the system determines that the excavator machine is being used for a "Truck Loading" operation (i.e., the operation of FIG. 3) (step 711).

If the system has determined that the excavator machine is being used for "load-and-carry," then the controller will adjust the drivetrain power and aggressiveness in anticipation that the tracks of the excavator will be operated to move the excavator from the first location to the second location after the lifting operational state is concluded (step 713). However, if the system has determined that the excavator machine is being used for "truck loading," then the controller will drive more power to the hydraulic system to increase responsiveness of the operation of the boom arm (step 715). Lastly, depending on the determined frequency of the lifting and lowering cycles, the system will determine when to operate the hydraulic pump to increase the hydraulic pressure available for adjusting the pose of the boom arm in anticipation of future lifting and lowering operational states (step 717).

The method of FIG. 7 is provided as an example of operations that may be performed by the controller based on the outputs of the AI modules. For example, the analysis of step 701 may be performed by the pattern detection AI and the determination of step 703 may be provided as the output of the pattern detection AI. Similarly, the adjustment to the power and aggressiveness of the drivetrain may be provided as "target operating parameters" that are output by the Reinforcement Learning AI.

As discussed above, in some implementations, the method of FIG. 7 may include receiving an output from the pattern detection AI and/or the reinforcement learning AI indicating a current operational state of the excavator and/or the predicted next operational state. In some such implementations, the system may be further configured to provide an indication of the current operational state and the predicted next operational state to the operator of the excavator on a display positioned in the operator cab of the excavator.

The specific machines, actuators, sensors, and adjustments described above are just a few examples of how these systems and methods may be implemented. Other implementations are also possible. For example, based on the determined current operational state and/or the predicted next operational state, the systems and methods may be configured to automatically adjust rimpull and hydraulic power split to maximize performance, to automatically enable electro-hydraulic parallelism when loading pallets, to switch to an "ultra-low power mode" when idling, to limit rimpull in response to detecting a trapped boom, to matching rimpull to boom pressure to help reduce spin while digging in a pile, to automatically enable ride control during transport, and to automatically disable ride control while filling the bucket. Furthermore, although the specific examples above focus primarily on automatic adjustments, in some implementations, the systems may be configured to output and display recommendations to an operator based on the determined current operational state and/or the predicted next operational state. For example, the system may be configured to display on a screen in the operator cab of the machine a suggestion that the operator turn on a "parallel lift" mode, but may be configured to apply the parallel lift mode only in response to a manual activation by the operator.

The systems and methods described above can also be extended to other specific operations and operational states of an excavator. For example, a "trenching" operation may include the following sequence of operational states: digging, transporting the machine, digging, transporting the machine, etc. In response to determining that the excavator is being used for a trenching operation, the system may be configured to shift the hydraulic flow splits such that travel actuators have the power when transporting and gradually adjusting the split back towards the boom arm actuators in anticipation of a transition into the next dig cycle to avoid abrupt changes with digging resumes. The system may also be configured to differentiate between "dumping" and "digging" operations and responds by changing the cross-relief pressure performance and/or the swing brake performance. In some implementations, the excavator system may be configured to make adjustments during a "dig cycle" operation by adjusting the swing/boom priority to match the operational state (or the predicted next operational state), control the use of hydraulic regeneration depending on the current state in the dig cycles, and selecting a low fan drive during light digging operations (e.g., grading) while applying a full fan drive for heavier digging operations (e.g., full buckets being moved as quickly as possible). In response to determining that the excavator is being used in a "crane-like" operation to lift and move an object, the system may automatically adjust the joystick resolution to allow the operator finer control on maneuvering the boom arm. In some implementations, the excavator system may be further configured to sense or receive information regarding the soil type (e.g., through a camera or a calibration procedure) and, based on the determined soil type/characteristics, to adjust the power, function, and bucket aggressiveness of the machine.

Other adjustments that might be made based on the identified current operational state of the excavator and/or the predicted next operation state include, for example, automatically controlling engine speed, power mode, hydraulics, and fan drive. For example, multiple different engine calibration settings may be stored to the system memory and changes on-the-fly to respond to operational changes and predictions. Similarly, operator comfort or preference may be addressed, for example, by delivering more aggressive shock dampening to a powered operator seat in response to a determination that the excavator is being used to transport over rough terrain.

Also, as noted above, the systems and methods described above can also be extended to other types of machines including, for example, a crawler or a loader. For a loader, the system might be configured to detect when the operator has performed multiple "rapouts" attempting to clear sticky material from the bucket and, in response, temporarily disable a "soft stop" feature of the loader to allow a more vigorous rap to shake the material out.

For a crawler, the controller may be adapted to provide adjustments to mode settings including, for example, automatically adjusting to a "cutting mode" in response to determining that the machine is being used for a "heavy dozing" operation and automatically adjusting to a "spreading mode" in response to determining that the machine is being used for a "light dozing" mode. The system may also be configured to improve tunings of adjustments to blade pitch control or blade lifting & spreading control in response to determining that the machine is being used for a "heavy dozing" operation. The machine might be configured to automatically change steering speed performance in response to determining whether the machine is being used for a "dozing" operation or for a "transporting" operation. The machine might also be configured to change an "ECO-mode" performance based on a determined operational state (for example, using a lower engine RPM during a "transporting" operation). In response to determining the current operational state or the predicted next operational state, the machine may change the aggressiveness, anti-stall performance, and/or transmission speed settings (e.g., more aggressive machine settings applied during "dozing" operations). Also, as noted above, the system may be configured to adjust various actuators and/or machine settings based on the soil type/characteristics if the machine is configured to sense or receive information about the soil conditions.

Thus, the invention provides, among other things, systems and methods for adjusting an operating parameter of a machine in anticipation of a transition from one operational state to another using a pattern detection AI to identify the current operational state and a reinforcement learning AI to determine target operating parameters. Various features and advantages are set forth in the accompanying claims.

What is claimed is:

1. A method for adjusting operating parameters of a machine in anticipation of a transition from a current operational state to a subsequent operational state, wherein the machine includes an excavator with a boom arm and a bucket coupled to a distal end of the boom arm, the method comprising:
receiving, by an electronic controller, a data stream indicative of at least one selected from a group consisting of actuator settings, sensor outputs, and operator control settings;
applying, by the electronic controller, a pattern detection AI, wherein the pattern detection AI is configured to
receive the data stream as an input,
determine a current operational state of the machine based on patterns detected in the data stream, and
determine, based on the data stream, when the current operational state of the machine is a lifting of the bucket;
applying, by the electronic controller, a reinforcement learning AI, wherein the reinforcement learning AI is configured to
identify the predicted subsequent operational state by identifying a current operation of the machine based on the determined current operational state of the machine and a sequence of previously determined operational states of the machine, wherein a current operation of the machine is defined based on a sequence of operational states where the machine repeats the operational states of lifting the material at a first location, traveling to a second location, releasing the material at the second location, and returning to the first location, and wherein the current operation is a lift-and-carry operation, and produce as an output one or more target operating parameters based at least in part on the predicted subsequent operational state, wherein the output is an adjustment to a power distribution of the machine to provide more power to the drivetrain in anticipation of the machine transitioning from the lifting operational state to a driving operational state in the lift-and-carrying operation;

applying, by the electronic controller, the one or more target operating parameters to the machine;

monitoring at least one performance metric of the machine after application of the one or more target operating parameters; and retraining the reinforcement learning AI based on the at least one monitored performance metric.

2. The method of claim 1, further comprising using unsupervised learning to retrain the pattern detection AI based on the data stream.

3. The method of claim 1, wherein the data stream includes a time-domain sequence of sensor outputs indicative of an operating characteristic of the machine.

4. The method of claim 3, wherein the machine includes an excavator arm, and wherein the data stream includes a time-domain sequence of sensor outputs indicative of a pose of the excavator arm.

5. The method of claim 1, wherein receiving the data stream includes receiving a time-domain data stream and converting the time-domain data stream to a frequency-domain data stream, and wherein the pattern detection AI is configured to receive the data stream as an input by receiving the frequency-domain data stream as an input.

6. The method of claim 1, wherein the pattern detection AI is configured to receive as inputs the data stream and a sequence of previously detected operational states of the machine and is configured to produce as an output an identification of the predicted subsequent operational state of the machine, and wherein the reinforcement learning AI is configured to receive as inputs the data stream and the identification of the predicted subsequent operational state of the machine.

7. The method of claim 6, wherein the pattern detection AI is further configured to produce as another output a predicted timing of a transition from the current operational state to the predicted subsequent operational state, and wherein the reinforcement learning AI is configured to receive as another input the predicted timing of the transition.

8. The method of claim 1, wherein the pattern detection AI is configured to produce as an output an identification of the current operational state of the machine, and wherein the reinforcement learning AI is configured to receive as inputs the identification of the current operational state of the machine and a sequence of previously detected operational states of the machine.

9. The method of claim 8, wherein the reinforcement learning AI is further configured to produce as an output an identification of the predicted subsequent operational state of the machine.

10. The method of claim 9, wherein the reinforcement learning AI is further configured to produce as an output a predicted timing of a transition from the current operational state to the predicted subsequent operational state of the machine, and wherein applying the one or more target operating parameters to the machine includes applying the one or more target operating parameters to the machine based on the predicting timing of the transition.

11. The method of claim 1, wherein applying the one or more target operating parameters to the machine includes applying the one or more target operating parameters to the machine in real-time as the one or more target operating parameters are output by the reinforcement learning AI.

12. The method of claim 1, wherein the one or more target operating parameters includes an adjustment to at least one actuator of the machine.

13. The method of claim 12, wherein the adjustment to the at least one actuator of the machine includes an increase in the hydraulic pressure produced by a hydraulic pump that will be used to extend one or more hydraulic cylinders after the transition from the current operational state to the predicted subsequent operational state.

14. The method of claim 1, wherein the one or more target operating parameters includes an adjustment to a machine setting of the machine.

15. A method for adjusting operating parameters of a machine in anticipation of a transition from a current operational state to a subsequent operational state, the method comprising:

receiving, by an electronic controller, a data stream indicative of at least one selected from a group consisting of actuator settings, sensor outputs, and operator control settings;

applying, by the electronic controller, a pattern detection AI, wherein the pattern detection AI is configured to receive the data stream as an input and to determine a current operational state of the machine based on patterns detected in the data stream;

applying, by the electronic controller, a reinforcement learning AI, wherein the reinforcement learning AI is configured to produce as an output one or more target operating parameters based at least in part on a predicted subsequent operational state, wherein the one or more target operating parameters includes an adjustment to a machine setting of the machine;

applying, by the electronic controller, the one or more target operating parameters to the machine, wherein the adjustment to the machine setting includes an adjustment to a power distribution of the machine to provide more power to a hydraulic system of the machine in anticipation of a transition to a predicted subsequent operational state in which the hydraulic system will utilize more power than in the current operational state of the machine;

monitoring at least one performance metric of the machine after application of the one or more target operating parameters; and retraining the reinforcement learning AI based on the at least one monitored performance metric.

* * * * *